(12) United States Patent
Kim et al.

(10) Patent No.: US 9,143,787 B2
(45) Date of Patent: Sep. 22, 2015

(54) METHOD AND APPARATUS FOR DETERMINING INTRA PREDICTION MODE, AND METHOD AND APPARATUS FOR ENCODING/DECODING VIDEO USING SAME

(75) Inventors: Hayoon Kim, Gyeonggi-do (KR); Yunglyul Lee, Seoul (KR); Joohee Moon, Seoul (KR); Haekwang Kim, Seoul (KR); Byeungwoo Jeon, Gyeonggi-do (KR); Dongkyun Kim, Seoul (KR); Daeyeon Kim, Seoul (KR); Kihun Han, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 658 days.

(21) Appl. No.: 12/937,252

(22) PCT Filed: Dec. 18, 2008

(86) PCT No.: PCT/KR2008/007502
§ 371 (c)(1),
(2), (4) Date: Feb. 7, 2011

(87) PCT Pub. No.: WO2009/125907
PCT Pub. Date: Oct. 15, 2009

(65) Prior Publication Data
US 2011/0176608 A1    Jul. 21, 2011

(30) Foreign Application Priority Data
Apr. 11, 2008  (KR) .................. 10-2008-0033951

(51) Int. Cl.
H04N 7/12        (2006.01)
H04N 19/11       (2014.01)
(Continued)

(52) U.S. Cl.
CPC ............... *H04N 19/11* (2014.11); *H04N 19/46* (2014.11); *H04N 19/593* (2014.11); *H04N 19/61* (2014.11)

(58) Field of Classification Search
CPC .................. H04N 19/00781; H04N 19/00763; H04N 19/00545; H04N 19/00042; H04N 19/11; H04N 19/46; H04N 19/61; H04N 19/593
USPC ......................................... 375/240.12, 240.29
See application file for complete search history.

(56) References Cited

U.S. PATENT DOCUMENTS 6,950,466 B2 * 9/2005 Kim et al. ................ 375/240.12
8,126,283 B1 * 2/2012 Garbacea et al. ............. 382/243
(Continued)

OTHER PUBLICATIONS

International Search Report for PCT/KR2008/007502.

*Primary Examiner* — William C Vaughn, Jr.
*Assistant Examiner* — Naod Belai
(74) *Attorney, Agent, or Firm* — Lowe Hauptman & Ham, LLP

(57) ABSTRACT

Disclosed are a method and apparatus for determining an intra prediction mode, and for encoding/decoding video using the same. An apparatus for determining an intra prediction mode is provided, the apparatus comprising a calculator to calculate a variation of adjacent pixels to a current block; a threshold setter to set a threshold to evaluate the pixel variation; a comparator to compare between the variation and the threshold; a first prediction mode determination unit to determine a single predetermined prediction mode to be an optimal prediction mode if the variation is below the threshold; and a second prediction mode determination unit to determine a particular prediction mode from a plurality of prediction modes to be the optimal prediction mode through a rate-distortion optimization by performing intra predictions in the plurality of prediction modes if the variation is greater than or equal to the threshold.

21 Claims, 11 Drawing Sheets

(51) Int. Cl.
*H04N 19/46* (2014.01)
*H04N 19/61* (2014.01)
*H04N 19/593* (2014.01)

(56) References Cited

U.S. PATENT DOCUMENTS

2005/0286630 A1* 12/2005 Tong et al. ............... 375/240.03
2006/0120450 A1   6/2006 Han et al.
2006/0165170 A1*  7/2006 Kim et al. ................ 375/240.12
2007/0036215 A1   2/2007 Pan et al.
2008/0175316 A1*  7/2008 Han ......................... 375/240.12
2008/0205515 A1*  8/2008 Kalva et al. .............. 375/240.02
2009/0175349 A1*  7/2009 Ye et al. ................... 375/240.23
2009/0238271 A1*  9/2009 Kim et al. ................ 375/240.12
2010/0091846 A1*  4/2010 Suzuki et al. ............ 375/240.12
2010/0309977 A1* 12/2010 Andersson et al. ...... 375/240.12

* cited by examiner

*INTRA PREDICTION MODE DETERMINING METHOD*

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

(b)

| N | N | N | N | N | N | N | N | N |
|---|---|---|---|---|---|---|---|---|
| N | a | b | c | d | | | | |
| N | e | f | g | h | | | | |
| N | i | j | k | l | | | | |
| N | m | n | o | p | | | | |

(a) Conventional Bitstream Structure (b) Bitstream Structure Of Present Disclosure

METHOD AND APPARATUS FOR DETERMINING INTRA PREDICTION MODE, AND METHOD AND APPARATUS FOR ENCODING/DECODING VIDEO USING SAME

CROSS REFERENCE TO RELATED APPLICATION

This application claims the priority of Korean Patent Application No. 10-2008-0033951, filed on Apr. 11, 2008 in the KIPO (Korean Intellectual Property Office), the disclosure of which are incorporated herein in their entirety by reference. Further, this application is the National Phase application of International Application No. PCT/KR2008/007502, filed Dec. 18, 2008, which designates the United States and was published in English. Each of these applications is hereby incorporated by reference in their entirety into the present application.

TECHNICAL FIELD

The present invention relates to a method and apparatus for determining an intra prediction mode, and a method and apparatus for encoding/decoding video using the same. More particularly, the present invention relates to a method and apparatus for determining an intra prediction mode, and a method and apparatus for encoding/decoding video using the same by omitting certain unnecessary intra prediction mode determining procedures to improve the compression efficiency.

BACKGROUND ART

Moving Picture Experts Group (MPEG) and Video Coding Experts Group (VCEG) have developed an improved and excellent video compression technology over existing MPEG-4 Part 2 and H.263 standards. The new standard is called H.264/AVC (Advanced Video Coding) and was released simultaneously as MPEG-4 Part 10 AVC and ITU-T Recommendation H.264.

The H.264/AVC (hereinafter referred to as 'H.264') uses a spatial predictive coding method, which is different from conventional video coding international standards such as MPEG-1, MPEG-2, MPEG-4 Part2 Visual and the like. Conventional methods use "intra prediction" for coefficients transformed in Discrete Cosine Transform Domain (or DCT Transform Domain) to seek higher encoding efficiency resulting in degradation of the subjective video quality at low band transmission bit rates. However, H.264 adopts the method of encoding based on a spatial intra prediction in a spatial domain rather than in a transform domain. An encoder that uses a coding method based on the conventional spatial intra predictions predicts current block information from information of the previously encoded and reconstructed previous blocks, encodes only the difference information between the actual block and the predicted block, and transmits the encoded information to a decoder. Then, the encoder may transmit parameters needed for prediction of the block to the decoder, or the encoder and decoder may be synchronized, so that they share the needed parameters for the decoder to predict the block. In terms of the decoder, the block information to be currently decoded is predicted using previously decoded and reconstructed adjacent block information and then added to the difference information transmitted from the encoder, which reconstructs the block to be decoded. Then, again, if the parameters needed for the prediction are transmitted from the decoder, the parameters can be decoded and used for prediction.

The above described intra prediction may be an intra_4×4 prediction, intra_16×16 prediction, intra_8×8 prediction and the like, where the respective intra predictions include a plurality of prediction modes.

Referring to FIG. 1, the intra_4×4 prediction has nine prediction modes which include a vertical mode, horizontal mode, direct current (DC) mode, diagonal down-left mode, diagonal down-right mode, vertical-right mode, horizontal-down mode, vertical-left mode and horizontal-up mode.

In addition, referring to FIG. 2, the intra_16×16 prediction has four prediction modes which include a vertical mode, horizontal mode, DC mode and plane mode. The intra_8×8 prediction also has four modes similar to the intra_16×16 prediction.

An H.264 encoder selects an optimal prediction mode out of a plurality of prediction modes and performs a prediction. Compression efficiency depends on what prediction mode is selected as the optimal prediction mode and used for a block prediction. In order to select the optimal prediction mode, a prediction of the block is performed with respect to every prediction mode before a cost is calculated using a predetermined cost function, and a prediction mode with the lowest cost is finally selected.

Therefore, in order to determine the optimal prediction mode whether it is intra_4×4 prediction or intra_16×16 prediction, the cost should be calculated after trying every prediction mode. This makes an encoding process complex and lowers the compression efficiency.

In addition, in case there exist identical or similar pixels in the adjacent blocks that produce the correspondingly identical or similar predicted values, a selecting method that requires predictions in all the prediction modes results in unnecessary process and lowers the coding efficiency.

DISCLOSURE

Technical Problem

Therefore, the present disclosure has been made in view of the above mentioned problems to provide in one embodiment a method and apparatus for determining intra prediction mode with reduced determining procedure for the intra prediction modes thereby achieving improved compression efficiency.

Another embodiment of the present disclosure provides a method and apparatus for effectively encoding a video by reducing the determining procedure for the intra prediction modes.

Yet another embodiment of the present disclosure provides a method and apparatus for effectively decoding the video by reducing the determining procedure for the intra prediction modes.

Technical Solution

According to an aspect of the present disclosure, there is provided an apparatus for determining an intra prediction mode comprising a variation calculator for calculating a variation of adjacent pixels relative to a current block; a threshold setter for setting a threshold to evaluate the pixel variation; a comparator for comparing between the variation and the threshold; a first prediction mode determination unit for determining a single predetermined prediction mode to be an optimal prediction mode if the variation is below the threshold; and a second prediction mode determination unit for determining a particular prediction mode from a plurality of prediction modes to be the optimal prediction mode through a rate-distortion optimization by performing intra predictions in the plurality of prediction modes if the variation is greater than or equal to the threshold.

According to another aspect of the present disclosure, there is provided a method for determining an intra prediction mode comprising: calculating a variation of adjacent pixels to a current block; comparing between the variation and a preset threshold; determining a single predetermined prediction mode to be an optimal prediction mode if the variation is below the threshold; and determining the optimal prediction mode from a plurality of prediction modes to be the optimal prediction mode through a rate-distortion optimization by performing intra predictions in the plurality of prediction modes if the variation is greater than or equal to the threshold.

According to yet another aspect of the present disclosure, there is provided a video encoding apparatus comprising: an intra predictor for calculating a variation of adjacent pixels relative to a current block to compare the variation with a preset threshold, determining a single predetermined prediction mode to be an optimal prediction mode if the variation is below the threshold, determining a particular prediction mode from a plurality of prediction modes to be the optimal prediction mode through a rate-distortion optimization by performing intra predictions in the plurality of prediction modes if the variation is greater than or equal to the threshold, and generating intra predicted values through performing the intra prediction using the determined optimal prediction mode; a subtractor for generating residual signals by subtracting the intra predicted value from actual current pixels within the current block; a transformer for performing discrete cosine transform with respect to the generated residual signals; a quantizer for performing quantization with respect to the discrete cosine transformed residual signals; and an encoder for encoding the quantized residual signals into a bitstream.

According to yet another aspect of the present disclosure, there is provided a video encoding method comprising: calculating a variation of adjacent pixels to a current block to compare the variation with a preset threshold; determining a single predetermined prediction mode to be an optimal prediction mode if the variation is below the threshold, and determining a particular prediction mode from a plurality of prediction modes to be the optimal prediction mode through a rate-distortion optimization by performing intra predictions in the plurality of prediction modes if the variation is greater than or equal to the threshold; generating intra predicted values through performing the intra prediction using the determined optimal prediction mode; generating residual signals by subtracting the intra predicted values from actual current pixels within the current block; performing discrete cosine transform with respect to the generated residual signals; performing quantization with respect to the discrete cosine transformed residual signals; and encoding the quantized residual signals into a bitstream.

According to yet another aspect of the present disclosure, there is provided a video decoding apparatus comprising: a decoder for decoding a received bitstream to extract residual signals; an inverse quantizer for performing inverse quantization with respect to the extracted residual signals; an inverse transformer for performing inverse discrete cosine transform with respect to the inversely quantized residual signals; an intra predictor for selecting either a first prediction mode that does not encode intra prediction mode information or a second prediction mode that encodes the intra prediction mode information based on a variation of adjacent pixels to a current block, and generating intra predicted values by performing an intra prediction in the selected mode; and an adder for adding the inversely discrete cosine transformed residual signals to the intra predicted values in order to reconstruct actual current pixels within the current block.

According to yet another aspect of the present disclosure, there is provided a video decoding method comprising: decoding a received bitstream; extracting residual signals and prediction mode information from the decoded bitstream; performing inverse quantization with respect to the extracted residual signals; performing inverse discrete cosine transform with respect to the inversely quantized residual signals; performing intra prediction to select either a first prediction mode that does not encode intra prediction mode information or a second prediction mode that encodes the intra prediction mode information based on a variation of adjacent pixels to a current block, and generating intra predicted values by performing an intra prediction in the selected mode; and reconstructing actual current pixels within the current block using the intra predicted values and the inversely discrete cosine transformed residual signals.

Advantageous Effects

As described above, according to the disclosure, unnecessary intra prediction mode determining procedures are reduced to achieve improved compression efficiency with which video can be encoded and decoded effectively.

DESCRIPTION OF DRAWINGS

FIG. 9 is a diagram showing variations of adjacent pixels according to an embodiment of the present disclosure.

MODE FOR INVENTION

Figure 1:
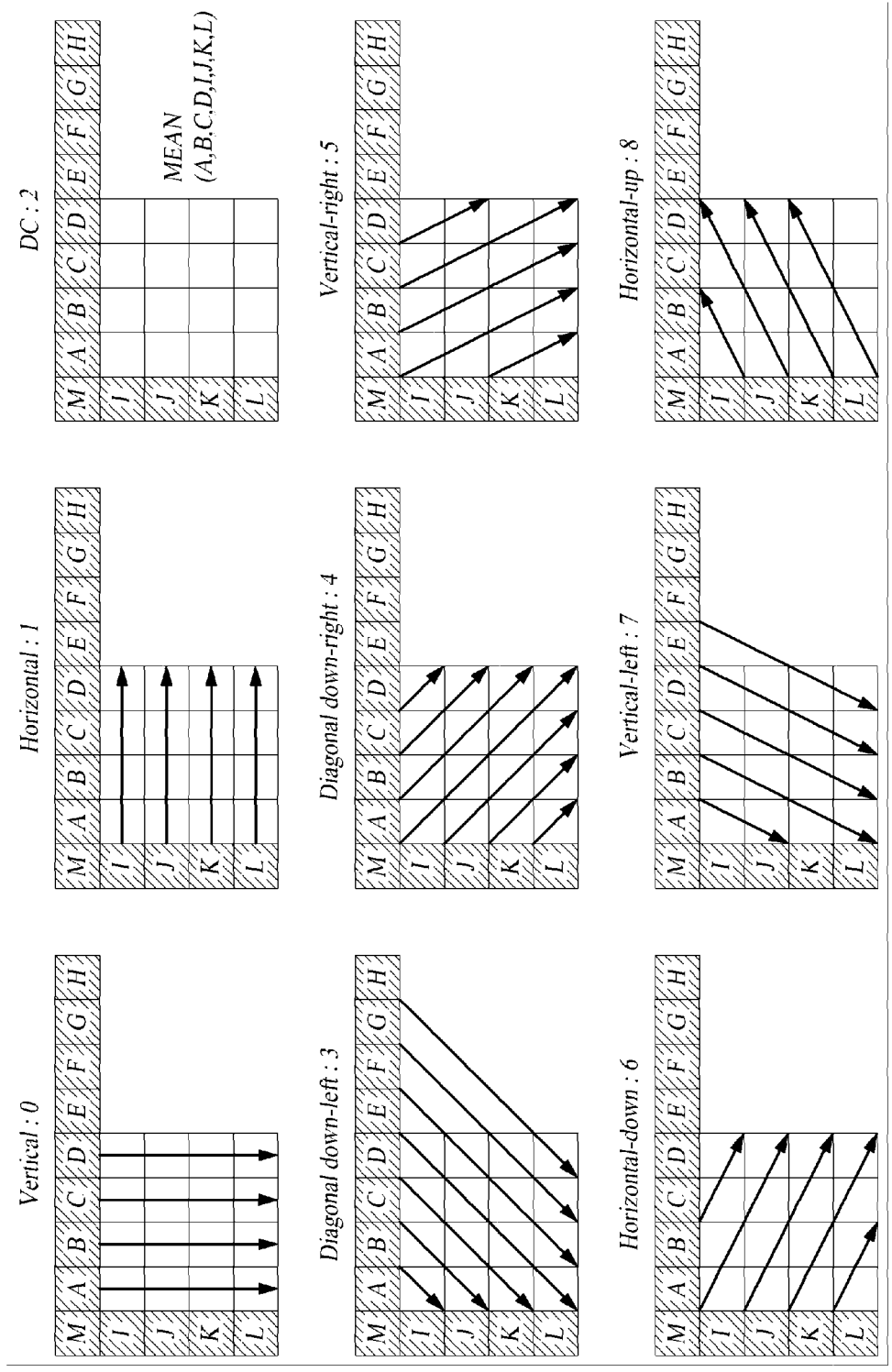
FIG. 1 is a diagram showing conventional nine 4×4 intra prediction modes.

Hereinafter, preferred embodiments of the present disclosure will be described with reference to the accompanying drawings. It is to be noted that the same elements are indicated with the same reference numerals throughout the drawings. In the following description, a detailed description of known configurations or functions incorporated herein will be omitted when it may make the subject matter of the disclosure rather unclear.

Figure 3:
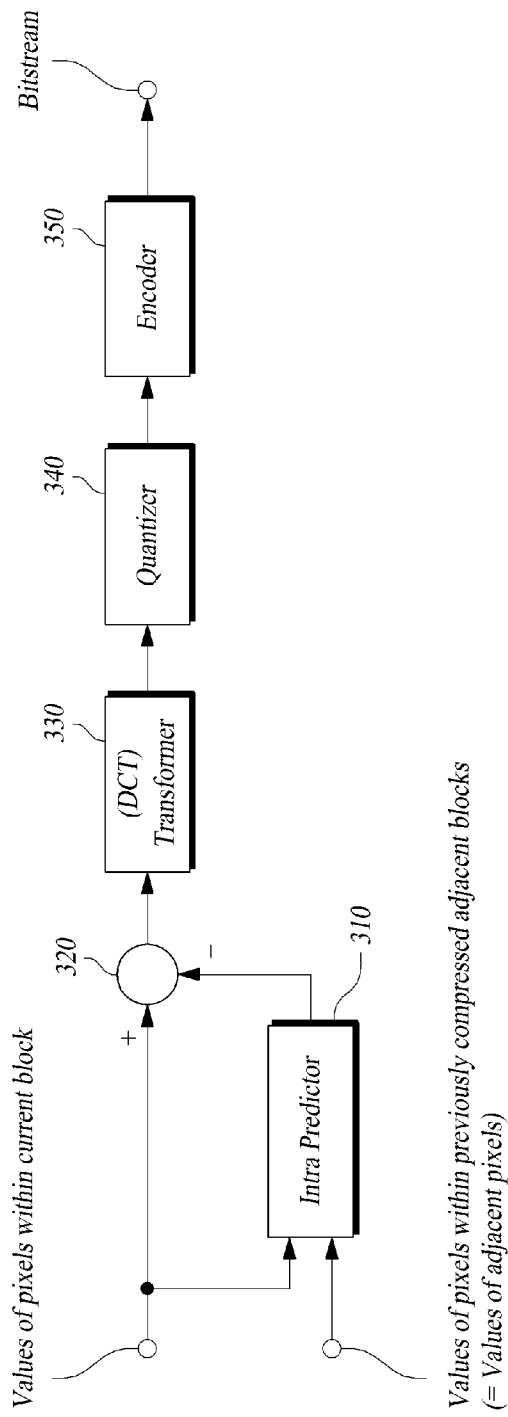
FIG. 3 is a block diagram of a video encoding apparatus according to an embodiment of the present disclosure.

FIG. 3 is a block diagram of a video encoding apparatus 300 according to an embodiment of the present disclosure.

Referring to FIG. 3, video encoding apparatus 300 of this embodiment includes an intra predictor 310, subtractor 320, discrete cosine transform (DCT) transformer 330, quantizer 340 and encoder 350.

Intra predictor 310 calculates a variation of adjacent pixels relative to a current block to compare the variation with a preset threshold. If the variation is below the threshold, it determines a single predetermined prediction mode to be an optimal prediction mode. If the variation is greater than or equal to the threshold, intra predictor 310 performs intra predictions in a plurality of prediction modes to determine a particular prediction mode from the plurality of prediction modes to be the optimal prediction mode through a rate-distortion optimization (RDO). Then, intra predictor 310 generates intra predicted values through performing the intra prediction using the optimal prediction mode as is determined above. The "adjacent pixels" refer to the pixels within the blocks that were compressed prior to the current block and are neighboring the same.

Subtractor 320 generates residual signal from the difference between actual current pixels within the current block and the intra predicted values generated from intra predictor 310.

DCT transformer 330 performs DCT with respect to the residual signal generated from subtractor 320. The present embodiment takes the typical DCT as an example, but various improvements or modifications of the DCT may be used in the disclosure.

Quantizer 340 performs quantization with respect to the discrete cosine transformed residual signal from DCT transformer 330.

Encoder 350 encodes the quantized residual signals from quantizer 340 into a bitstream.

Intra predictor 310 may be divided into a section for determining an intra prediction mode and a section for performing the intra prediction in the determined intra prediction mode of which the intra prediction mode determining section will be described in more detail below.

Intra predictor 310 calculates the variation of the adjacent relative to the current block, sets the threshold to evaluate the similarity of the adjacent pixels and compares between the calculated variation and the preset threshold to decide whether the adjacent pixels have the similarity.

Based on the result of the comparison, intra predictor 310 determines between a first prediction mode that does not encode intra prediction mode information and a second prediction mode that encodes the intra prediction mode information.

If intra predictor 310 decides from the comparison that the variation of the adjacent pixels is great, a plurality of prediction modes are used to predict the current block before it is compressed pursuant to conventional method, and if the variation of the adjacent pixels is minor, a prediction mode is singled out of the plurality of prediction modes of the current block for use in the prediction of the current block and its compression.

Considering the second prediction mode that performs predictions in all of the plurality of prediction modes of the current block once the variation of the adjacent pixels are determined to be great, if the calculated variation is equal to or greater than the threshold, intra predictor 310 performs intra predictions in the "a plurality of prediction modes" and determines a particular prediction mode from the plurality of prediction modes to be the optimal prediction mode through a rate-distortion optimization (RDO). When predicting in the second mode, the bits representing the determined prediction mode as the optimal prediction mode, i.e. prediction mode information is included in the bitstream to be sent to encoder 350.

The above "a plurality of prediction modes" include nine prediction modes in the intra_4×4 mode prediction, and four prediction modes in the intra_16×16 mode prediction.

Figure 10:
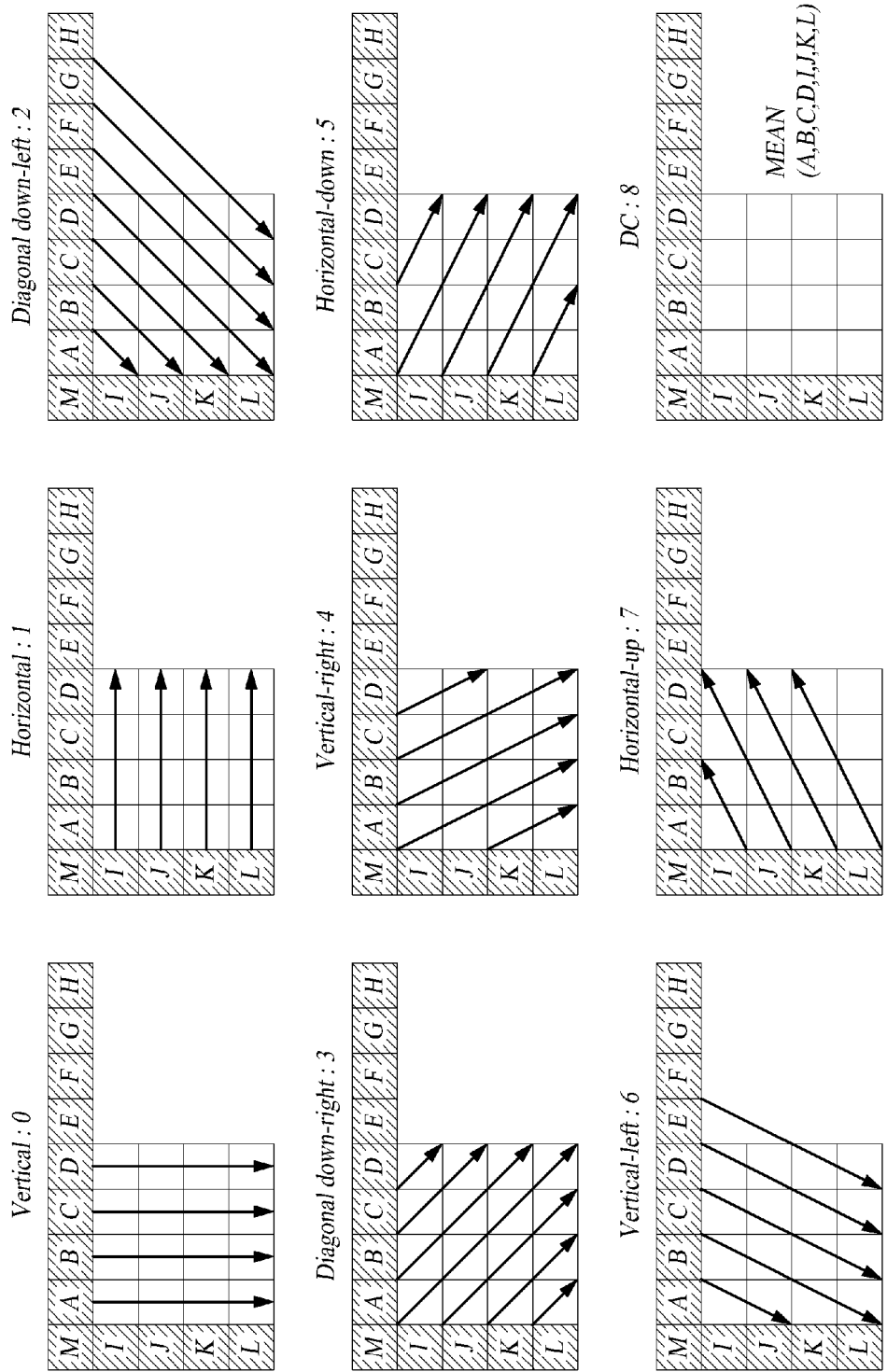
FIG. 10 is a diagram showing nine 4×4 intra prediction modes with a changed prediction sequence according to an embodiment of the present disclosure.

As shown in FIG. 10, the nine prediction modes in the intra_4×4 mode prediction comprise a vertical mode, horizontal mode, direct current (DC) mode, diagonal down-left mode, diagonal down-right mode, vertical-right mode, horizontal-down mode, vertical-left mode and horizontal-up mode. But, the nine prediction modes shown in FIG. 10 are in a different sequence from the conventional nine prediction modes in FIG. 9. The change of prediction mode sequence will be described in detail below.

Figure 2:
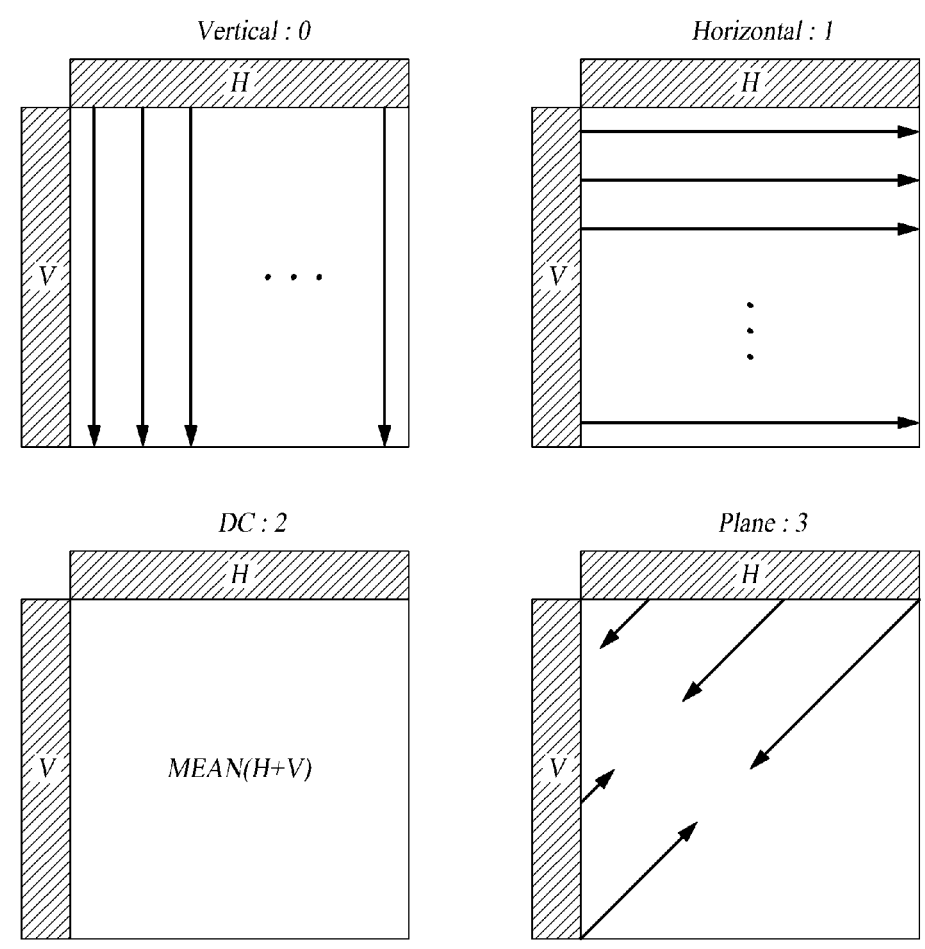
FIG. 2 is a diagram showing conventional four 16×16 intra prediction modes.

In case of the intra_16×16 mode prediction, the four prediction modes comprise a vertical mode, horizontal mode, DC mode and plane mode. This is depicted in FIG. 2 showing the conventional four prediction modes. But, the intra_16×16 mode prediction according to an embodiment of the present disclosure may have changes in the prediction sequence as in the intra_4×4 mode prediction.

Next, referring to the first prediction mode that does not perform predictions in all of the plurality of prediction modes of the current block but only a single prediction mode after the variation of the adjacent pixels are determined to be minor, if the calculated variation is below the threshold, intra predictor 310 performs the intra prediction utilizing a single predetermined intra prediction mode to generate intra predicted values. When predicting in the first mode, bits representing the above single predetermined prediction mode, i.e. prediction mode information is not included in the bitstream to be sent to encoder 350.

A video decoding apparatus 500 (see FIG. 5) may determine which one of the first and second prediction modes was used in the intra prediction with respect to the block to be currently decoded (current block) by implementing the disclosed prediction mode determining method described above as in intra predictor 310. If it is determined that the current block was intra predicted in the first prediction mode, video decoding apparatus 500 performs the intra prediction by utilizing the single predetermined intra prediction mode to generate the intra predicted values for recovering the current block. In this case of predicting the current block in the first prediction mode, the intra prediction can be achieved through using the single intra prediction mode arranged between the video encoding and decoding apparatus so that the prediction mode information may not be included in the bitstream. Therefore, the intra prediction as performed in the first prediction mode will reduce the amount of data to transmit.

As described above, in the case where the variation of the adjacent pixels is minor and determined to be below the threshold, in either intra_4×4 mode prediction or intra_16×16 mode prediction, only a single prediction mode is applied rather than all of the plurality of prediction modes to perform the intra predictions for the compression, thereby improving the compression efficiency without affecting the intra prediction performance. This will be described as an example referring to FIG. 9.

In FIG. 9, diagram (a) shows pixels used in the intra_4×4 mode prediction in H.264. Sixteen pixels in small letters a to p represent the current block pixels and thirteen pixels in capital letters A to M represent the previously compressed surrounding blocks pixels (adjacent pixels).

When performing the intra predictions on the current block shown in FIG. 9 at (a) using the nine prediction modes for the conventional intra_4×4 mode prediction shown in FIG. 1, predictions in nine different directions are performed with the previously compressed A to M pixel values to obtain the optimal prediction direction of making the compression.

For example, in the prediction mode 1 in the horizontal direction in FIG. 1, the first row of pixels a, b, c, d may be predicted as in Equation 1 below.

$$a'=a-I$$
$$b'=b-I$$
$$c'=c-I$$
$$d'=d-I \qquad \text{[Equation 1]}$$

In the prediction mode 3 in the diagonal down-left direction in FIG. 1, the first row of pixels a, b, c, d may be predicted as in Equation 2 below.

$$a'=a-[(A+2B+C)/4]$$
$$b'=b-[(B+2C+D)/4]$$
$$c'=c-[(C+2D+E)/4]$$
$$d'=d-[(D+2E+F)/4] \qquad \text{[Equation 2]}$$

Also in the remaining prediction modes, predictions may be similarly performed using the previously compressed adjacent pixel values to produce the residual signals.

If the thirteen pixel values (capital A to M) of the adjacent pixels in FIG. 9 at (a) were commonly equal to capital N as in FIG. 9 at (b), then in the prediction mode 1 in the horizontal direction in FIG. 1, the first row of pixels a, b, c, d may be predicted as in Equation 3 below.

$$a'=a-N$$
$$b'=b-N$$
$$c'=c-N$$
$$d'=d-N \qquad \text{[Equation 3]}$$

In the prediction mode 3 in the diagonal down-left direction in FIG. 1, the first row of pixels a, b, c, d may be predicted as in Equation 4 below.

$$a'=a-[(N+2N+N)/4]=a-N$$
$$b'=b-[(N+2N+N)/4]=b-N$$
$$c'=c-[(N+2N+N)/4]=c-N$$
$$d'=d-[(N+2N+N)/4]=d-N \qquad \text{[Equation 4]}$$

Through Equations 3 and 4, in the case where the adjacent pixels are identical as in FIG. 9(b), if the nine prediction modes were used for the intra_4×4 mode prediction, the prediction results for the prediction modes 1 and 3 are identical. Therefore, it is obvious that in the intra_4×4 mode prediction performing the predicted compressions in every prediction mode may not be necessary but a single prediction mode may be performed without affecting the compression efficiency.

Likewise, the compression efficiency may be retained even with executing a single prediction mode if the adjacent blocks were not entirely identical but had close values to a certain degree as against the identical blocks since the predicted values in the respective prediction directions will be in a close range. In this occasion, a variation of the adjacent pixels is calculated to determine similarity of the adjacent pixels through comparing the pixel variation to a predetermined threshold which will be described in detail hereinafter.

The above described encoder 350 performs an encoding using the quantized residual signals from quantizer 340 to generate the bitstream, which includes a first field to which bits for a coded block pattern (CBP) and residual coefficients are assigned and a second field to which bits for intra prediction mode information are assigned.

Figure 11:
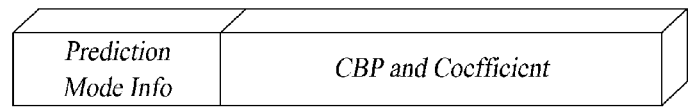
FIG. 11 illustrates a changed bitstream structure according to an embodiment of the present disclosure.
Figure 11:
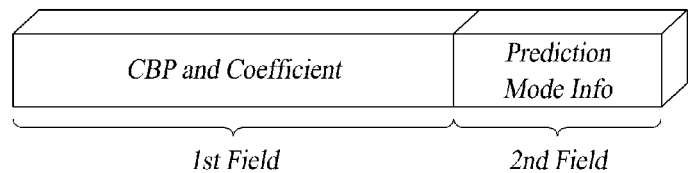

Here, the first field with the assigned bits for a coded block pattern (CBP) and residual coefficients precedes the second field with the assigned bits for the intra prediction mode information which can be seen in the bitstream structure depicted in FIG. 11.

As shown in FIG. 11 at (a), the conventional bitstream is structured with prediction mode information assigned ahead of the CBP and residual coefficients while in FIG. 11(b) showing an embodiment of the present disclosure, the bitstream is structured to allocate the prediction mode information behind the CBP and residual coefficients.

Additionally, as described above, intra predictor 310 calculates the variation of the adjacent pixels relative to the current block and compares the variation with the predetermined threshold to determine the single predetermined prediction mode to be the optimal prediction mode if the calculated variation is below the threshold. In such case where the pixel variation is below the threshold resulting in the single predetermined prediction mode determined to be the optimal prediction mode (first prediction mode), encoder 350 chooses to encode the bits for the prediction mode information of the determined optimal prediction mode with "unassigning" the same bits to the bitstream's second field (where bits for the prediction mode information are assigned).

In contrast, upon calculating the variation of the adjacent pixels to the current block, the intra predictor 310 compares the variation with the predetermined threshold and if the calculated variation is greater than or equal to the threshold, performs intra predictions in a plurality of prediction modes and determines a particular prediction mode from the plurality of prediction modes to be the optimal prediction mode through the rate-distortion optimization. When predicting in the second mode, the bits representing the determined prediction mode to be the optimal prediction mode, i.e. prediction mode information is included in the bitstream to be sent to decoder 350. In such case where the pixel variation is greater than or equal to the threshold resulting in the intra predictions performed in the plurality of prediction modes in order to determine the optimal prediction mode, encoder 350 chooses to encode the bits for the prediction mode information of the determined optimal prediction mode through the rate-distortion optimization with "assigning" the same bits to the bitstream's second field (where bits for the prediction mode information are assigned).

As shown in FIG. 11 at (a) and (b), the altered structure of the bitstream in encoder 350 according to one embodiment of the present disclosure is caused by unassigning to the bitstream the bits for the prediction mode information in the above first prediction mode. If the bits for the prediction mode information in the first prediction mode were unassigned to the bitstream and encoded into the conventional bitstream structure, the decoder receiving the encoded bitstream in the conventional structure would not be able to distinguish the difference between the prediction mode information, CBP and residual coefficients. In other words, it would be difficult to identify sections of the bitstream where the prediction mode information ends and the CBP and residual coefficients start. To solve this problem, the disclosed embodiment changes the sequence of the bitstream by transmitting the first field to which the CBP and residual coefficients are allocated first and next the second field to which the prediction mode information is assigned. In this way, decoder 510 can extract the CBP and residual coefficients in predetermined formats of the CBP and residual coefficients without a problem, and thereafter a prediction mode determining method according to one embodiment of the present disclosure determines between the first prediction mode and second prediction mode so that the decoder knows if prediction mode information of a particular subblock is present in the bitstream.

Figure 4:
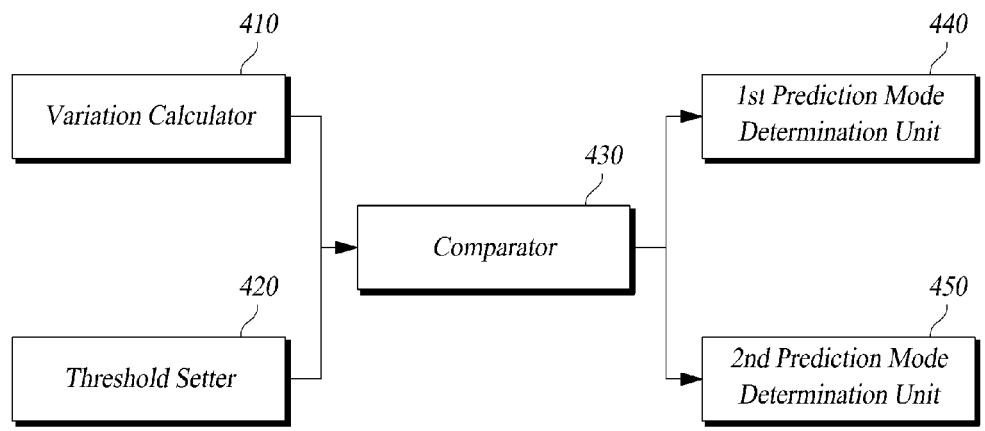
FIG. 4 is a block diagram of an intra prediction mode determining apparatus according to an embodiment of the present disclosure.

FIG. 4 is a block diagram of an intra prediction mode determining apparatus 400 according to an embodiment of the present disclosure.

FIG. 4 shows intra prediction mode determining apparatus 400 is comprised of a variation calculator 410, threshold setter 420, comparator 430, first prediction mode determination unit 440 and a second prediction mode determination unit 450.

Variation calculator 410 calculates a variation of a adjacent pixels to the current block.

Threshold setter 420 sets a threshold that bases the determination on how similar are the adjacent pixels to the current block to evaluate the variation.

Comparator 430 compares between the calculated variation in variation calculator 410 and the set threshold in threshold setter 420.

Based on the comparison result in comparator 430, first prediction mode determination unit 440 determines to be the optimal prediction mode the predetermined "single prediction mode" if the variation is below the threshold.

Second prediction mode determination unit 450 performs the intra predictions in "a plurality of prediction modes" based on the comparison result in comparator 430 and if the variation is greater than or equal to the threshold, determines a particular prediction mode among the plurality of prediction modes to be the optimal prediction mode through the rate-distortion optimization.

Variation calculator 410 calculates a variation of pixel values of (adjacent) pixels included in the blocks surrounding the current block using dispersion. Herein, the dispersion is a statistical index including variance, standard deviation and quartile deviation, one of which may be used by variation calculator 410. Here, "variation of the adjacent pixels" is an index to represent how similar the adjacent pixels are to one another. The smaller the variation, the more similar the adjacent pixels are.

As an example, if the current block has the size of N×M (N, M are natural numbers) and standard deviation is used to calculate the variation of the adjacent pixels, variation calculator 410 may use Equation 5 below to calculate the adjacent pixel value variation.

$$\sigma_p = \sqrt{\left[\sum_{k=0}^{M}(u_k - m_u)^2 + \sum_{k=0}^{N}(l_k - m_l)^2\right]/8}$$ [Equation 5]

$u_k$: pixel values of the upper block boundary in the current block
$l_k$: pixel values of the left block boundary in the current block
$m_u$: an average of $u_k$
$m_l$: an average of $l_k$ In order to effectively compress the above mentioned block, besides the adjacent pixel variation calculated in variation calculator 410, a threshold must be determined to provide reference information for evaluating the degree of the calculated variation of the adjacent pixels. Such appropriate determination of threshold may be accomplished in threshold setter 420.

Threshold setter 420 utilizes quantization parameter (QP) and quantization step size ($Q_{step}$) to determine the threshold (Th) and set the same adaptively.

The "threshold" described above is reference information for use in deciding whether there are similarities among the adjacent pixels in the current block. If the adjacent pixel variation calculated using Equation 5 in variation calculator 410 is below the set threshold, then the adjacent pixels have a smaller variation than the reference value and thus the corresponding adjacent pixels are determined to be close to one another. However, if the pixel variation is greater than or equal to the threshold, the adjacent pixels have a greater variation than the reference value and thus the corresponding adjacent pixels may be determined to be different from one another.

Further, threshold setter 420 may set the quantization parameter (QP) for controlling the quantization to an arbitrary integer value. For example, in H.264 it may set the QP to be one in the range of 0 to 51. That is, threshold setter 420 may set fifty two quantization parameters and in turn fifty two thresholds.

Threshold setter 420 may set the quantization step size ($Q_{step}$) as information for controlling the quantization strength based on the quantization parameter (QP). For example, in H.264, whenever the QP increases by six, the quantization step size ($Q_{step}$) characteristically doubles. Taking advantage of this characteristic threshold setter 420 may controllably set the quantization step size ($Q_{step}$) by two times at the increments of the quantization parameter (QP) by six.

The above described threshold (Th) setting by setter 420 may be done utilizing Equation 6 below.

$$Th = \text{floor}\left(\frac{Q_{step}}{X} - \frac{QP}{Y}\right)$$ [Equation 6]

floor( ): round function in an integer
$Q_{step}$: quantization step size
QP: quantization parameter
X, Y: constant It is possible to set the threshold (Th) by substituting a particular constant for X in the above Equation 6 as well as substituting a particular constant for Y. The constant X and/or constant Y may have their substitute values changed according to the quantization parameter (QP) and/or quantization step size ($Q_{step}$) or the amount of the desired threshold (Th).

The "single prediction mode" used in first prediction mode determination unit 440 to determine the optimal prediction mode is the prediction mode that was preset in intra predictor 310 for use as the optimal prediction mode when the calculated variation of the adjacent pixels within the surrounding blocks of the current block is below the preset threshold. This "single prediction mode" may be programmed to be preset in video encoding apparatus 300 and video decoding apparatus 500.

As an example, first prediction mode determination unit 440 may preset as the single prediction mode a prediction mode that uses the average of the adjacent pixels value for predicted values, and then determine the single prediction mode to be the optimal prediction mode. In this case, the prediction mode that uses the average of the adjacent pixel values for the intra predicted values is the DC mode that is used in the intra_4×4 mode prediction or intra_16×16 mode prediction. However, other prediction modes than the DC mode may be preset to be the single prediction mode that will be determined the optimal prediction mode.

The above described second prediction mode determination unit 450 performs the intra predictions in each of the plurality of prediction modes, calculates the cost through a predetermined cost function defined in the rate-distortion optimization and determines the prediction mode with the lowest cost to be the optimal prediction mode.

The predetermined cost function may have Sum of Absolute Value (SAD), Sum of Absolute Transformed Difference (SATD), Sum of Squared Difference (SSD), Mean of Absolute Difference (MAD), Lagrange Function, etc. The SAD is obtained by taking the absolute values of the respective 4×4 block prediction errors (residual signals) values and summing them. The SATD is obtained by taking the absolute values of coefficients generated by applying Hadamard Transform to the respective 4×4 block prediction errors (residual signals) values and summing them. The SSD is the sum of squares of the respective 4×4 block prediction sample errors (residual signals) values and the MAD is obtained by taking the absolute values of the respective 4×4 block prediction sample errors (residual signals) values and averaging them. Lagrange Function is a cost function obtained by adding length information of the bitstream to a cost function.

The above described second prediction mode determination unit 450 may changeably set the prediction sequence to perform the intra predictions in the plurality of prediction modes. Upon confirming that the variation is greater than or equal to the threshold through the comparison in comparator 430 meaning the variation of the adjacent pixels is greater than or equal to the threshold, if the DC mode using the average of the adjacent pixel values for the intra predicted values were the prediction mode 2 as shown in FIG. 1, then there is less probability that the DC mode of prediction mode 2 will be determined to be the optimal prediction mode or compression mode. Therefore, second prediction mode determination unit 450 may reset the order of prediction of the DC mode to be the last.

As in FIG. 10 showing one embodiment of intra_4×4 mode predictions, among the nine different prediction modes, the DC mode may be relocated from prediction mode 2 to prediction mode 8 in preparation for the compression. In this case, the compression is performed with intra predictions in the sequence of vertical mode, horizontal mode, diagonal down-left mode, diagonal down-right mode, vertical-right mode, horizontal-down mode, vertical-left mode, horizontal-up mode and direct current (DC) mode. Specifically, as in FIG. 10, the vertical and horizontal modes may maintain as mode 0 and 1 respectively, and the diagonal down-left mode may be relocated to mode 2, the diagonal down-right mode to mode 3, the vertical-right mode to mode 4, the horizontal-down mode to mode 5, the vertical-left mode to mode 6, the horizontal-up mode to mode 7 and the direct current (DC) mode to mode 8.

With the above described intra prediction mode determining apparatus 400, the unnecessary processes in determining the intra prediction modes can be reduced to improve the compression efficiency with which video encoding apparatus 300 and video decoding apparatus 500 will encode and decode effectively accordingly.

The intra prediction mode determining apparatus 400 may be installed in video encoding apparatus 300 at intra predictor 310 inwardly thereof or at its input side.

Figure 5:
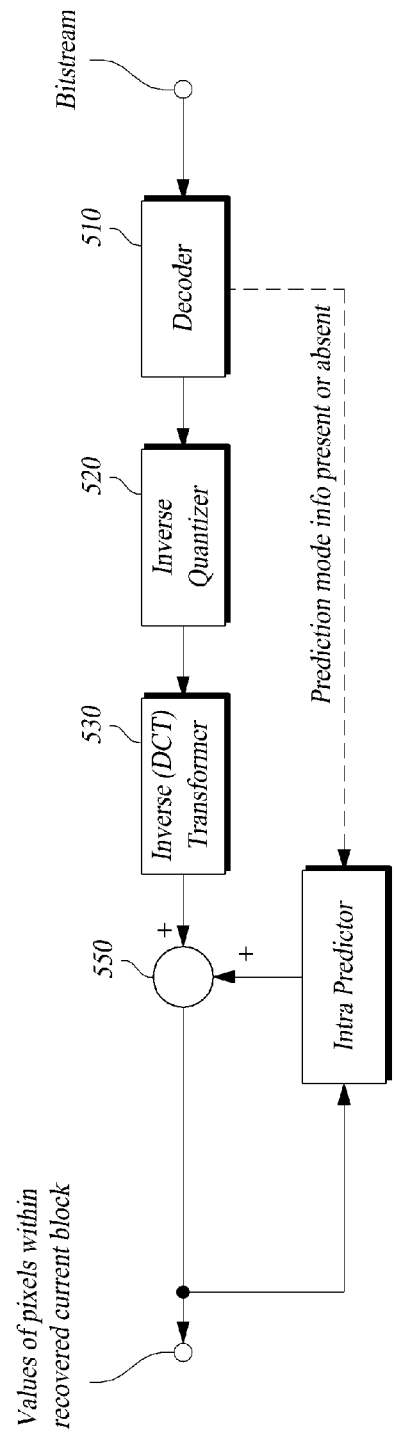
FIG. 5 is a block diagram of a video decoding apparatus according to an embodiment of the present disclosure.

FIG. 5 is a block diagram of a video decoding apparatus 500 according to an embodiment of the present disclosure.

Referring to FIG. 5, video decoding apparatus 500 of this embodiment includes a decoder 510, inverse quantizer 520, inverse (DCT) transformer 530, intra predictor 540, and adder 550.

Decoder 510 decodes the received bitstream to extract the residual signals and identify the presence of prediction mode information.

Inverse quantizer 520 inversely quantizes the residual signals extracted in decoder 510.

Inverse DCT transformer 530 performs inverse discrete cosine transform with respect to the inversely quantized residual signals from inverse quantizer 520. The present embodiment describes a typical inverse DCT as an example, but various improvements or modifications of the inverse DCT may be used in the disclosure.

Intra predictor 540 may determine in which one of the first and second prediction modes the block to currently decode (current block) was intra predicted by prosecuting the prediction mode determining method of the present disclosure as in video encoding apparatus 300. If it were determined that the current block was intra predicted in the first prediction mode, then the prediction may be performed in the single predetermined prediction mode to obtain the predicted values for recovering the current block.

If it is determined that the current block was intra predicted in the second prediction mode, then the information representing the intra prediction mode extracted from the received bitstream will be used to perform the intra prediction. That is, the predicted values of the current block are obtained through executing the prediction modes, which are represented by the extracted intra prediction mode information.

Adder 550 adds the inversely discrete cosine transformed residual signals from inverse (DCT) transformer 530 to the intra predicted values from intra predictor 540 to recover the values of actual current pixels within the current block.

Decoder 510 decodes the bitstream including a first field to which bits for the coded block pattern (CBP) and residual coefficients are assigned and a second field to which bits for intra prediction mode information are assigned in order to extract the residual signals from the first field and identify the presence of the prediction mode information from the second field. Here, the first field is included in front of the second field.

Figure 6:
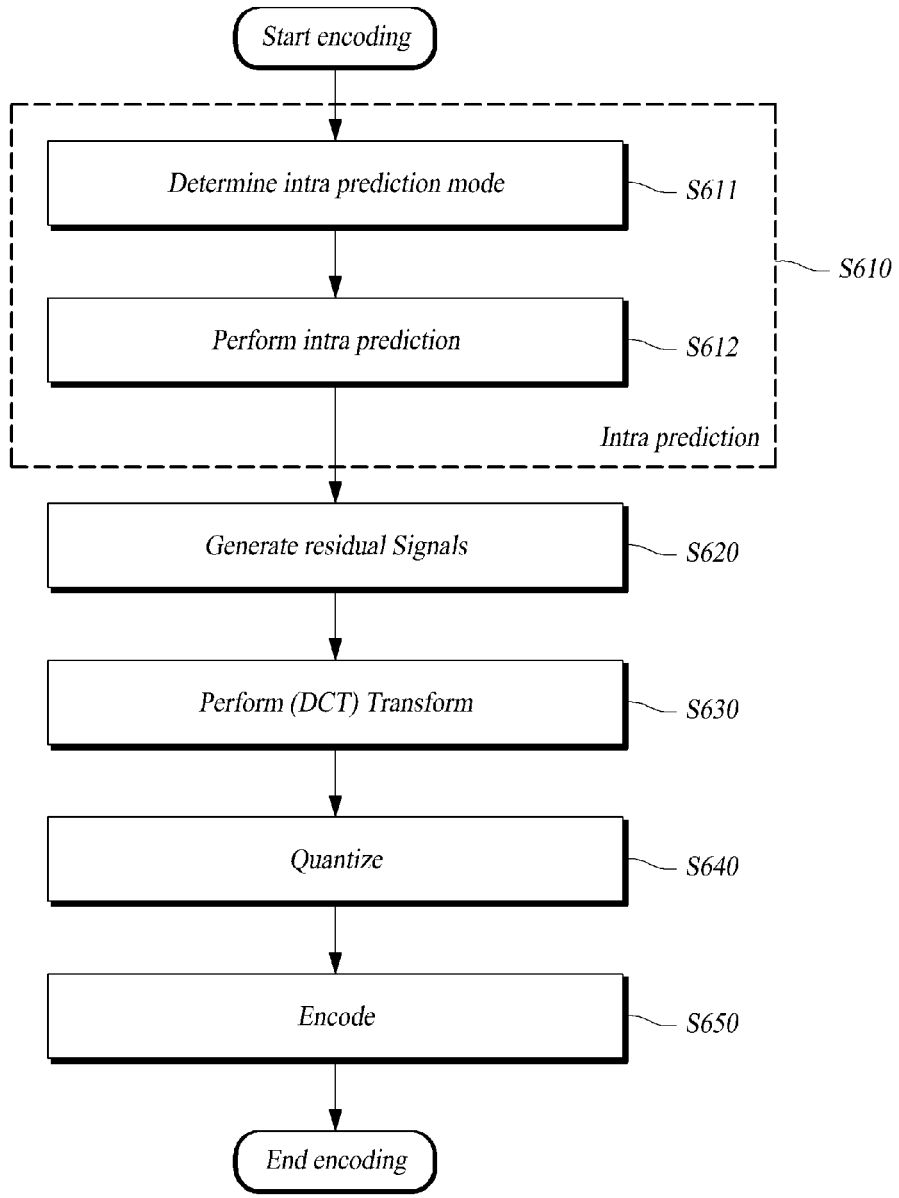
FIG. 6 is a flow diagram of a video encoding method according to an embodiment of the present disclosure.

FIG. 6 is a flow diagram of a video encoding method according to an embodiment of the present disclosure.

Referring to FIG. 6, the video encoding method of the present disclosure may be comprised of steps of an intra prediction S610, generating residual signals S620, discrete cosine transforming S630, quantizing S640 and encoding S650.

In intra prediction step S610, the variation of adjacent pixels to a current block is calculated to compare the variation with a preset threshold, and if the variation is below the threshold, a single predetermined prediction mode is determined to be an optimal prediction mode, and if the variation is greater than or equal to the threshold, a particular prediction mode from a plurality of prediction modes is determined to be the optimal prediction mode through a rate-distortion optimization by performing intra predictions in the plurality of prediction modes, and intra predicted values are generated through performing the intra prediction using the determined optimal prediction mode.

The residual signal generating step S620 generates residual signals from the difference between the actual current pixels within the current block and the intra predicted values from the intra prediction S610.

The discrete cosine transforming step S630 discrete cosine transforms the generated residual signals from the residual signal generating step S620.

The quantizing step S640 quantizes the discrete cosine transformed residual signals from the DCT step S630.

The encoding step S650 encodes the quantized residual signals from the quantizing step S640 into bitstream.

The encoding step S650 encodes the quantized residual signals into the bitstream, which includes a "first field" to which bits for the coded block pattern (CBP) and residual coefficients are assigned and a "second field" to which bits for intra prediction mode information are assigned. Here, the first field is located ahead of the second field.

The encoding step S650 chooses to "unassign" the bits for the prediction mode information of the determined optimal prediction mode to the bitstream's second field if the calculated pixel variation in the intra prediction step S610 is below the threshold.

However, the encoding step S650 "assigns" to the second field the bits for prediction mode information of the optimal prediction mode determined if the variation is greater than or equal to the threshold.

At the same time, the intra prediction step S610 may be divided into a step for determining the intra prediction mode S611 and a step for performing the intra prediction S612.

The intra prediction mode determining step S611 calculates variation of adjacent pixels to a current block to compare the variation with a preset threshold, and if the calculated variation is below the threshold, determines a single predetermined prediction mode to be an optimal prediction mode, and if the variation is greater than or equal to the threshold, determines a particular prediction mode from the plurality of prediction modes to be the optimal prediction mode through a rate-distortion optimization by performing intra predictions in the plurality of prediction modes.

The intra prediction performing step S612 performs the intra predictions using the determined optimal prediction mode from the intra prediction mode determining step S611 to generate the intra predicted values.

Figure 7:
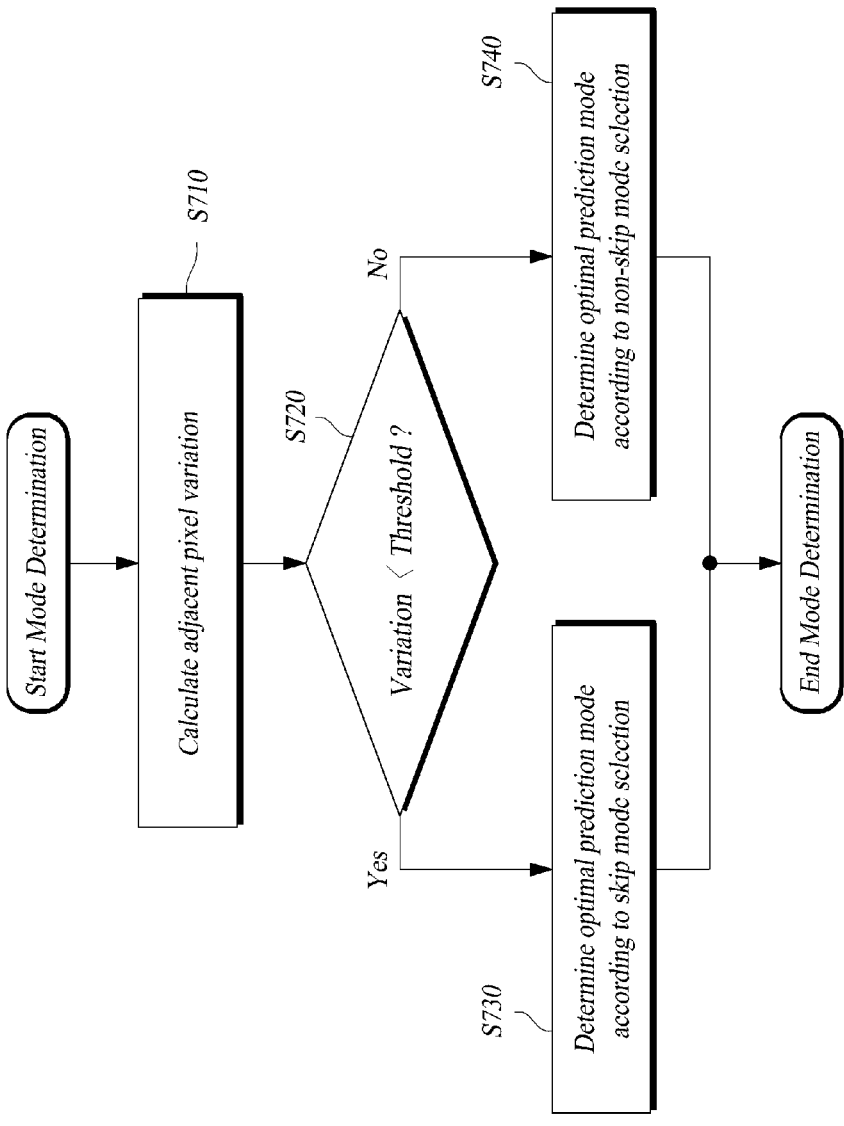
FIG. 7 is a flow diagram of an intra prediction mode determining method according to an embodiment of the present disclosure.

FIG. 7 is a flow diagram of an intra prediction mode determining method according to an embodiment of the present disclosure.

Referring to FIG. 7, intra prediction mode determining method may be comprised of the steps of calculating a variation adjacent pixels to a current block (S710), comparing between the calculated variation and a preset threshold (S720), if the variation is below the threshold at the comparison result of the step S720, selecting a first prediction mode and determining a single predetermined prediction mode to be an optimal prediction mode (S730), and if the variation is greater than or equal to the threshold at the comparison result of the step S720, selecting a second prediction mode and determining the optimal prediction mode from a plurality of prediction modes through a rate-distortion optimization by performing intra predictions in the plurality of prediction modes.

Step S730 may be referred to an optimal prediction mode determining step according to the first prediction mode selection and step S740 may be referred to an optimal prediction mode determining step according to the second prediction mode selection.

Figure 8:
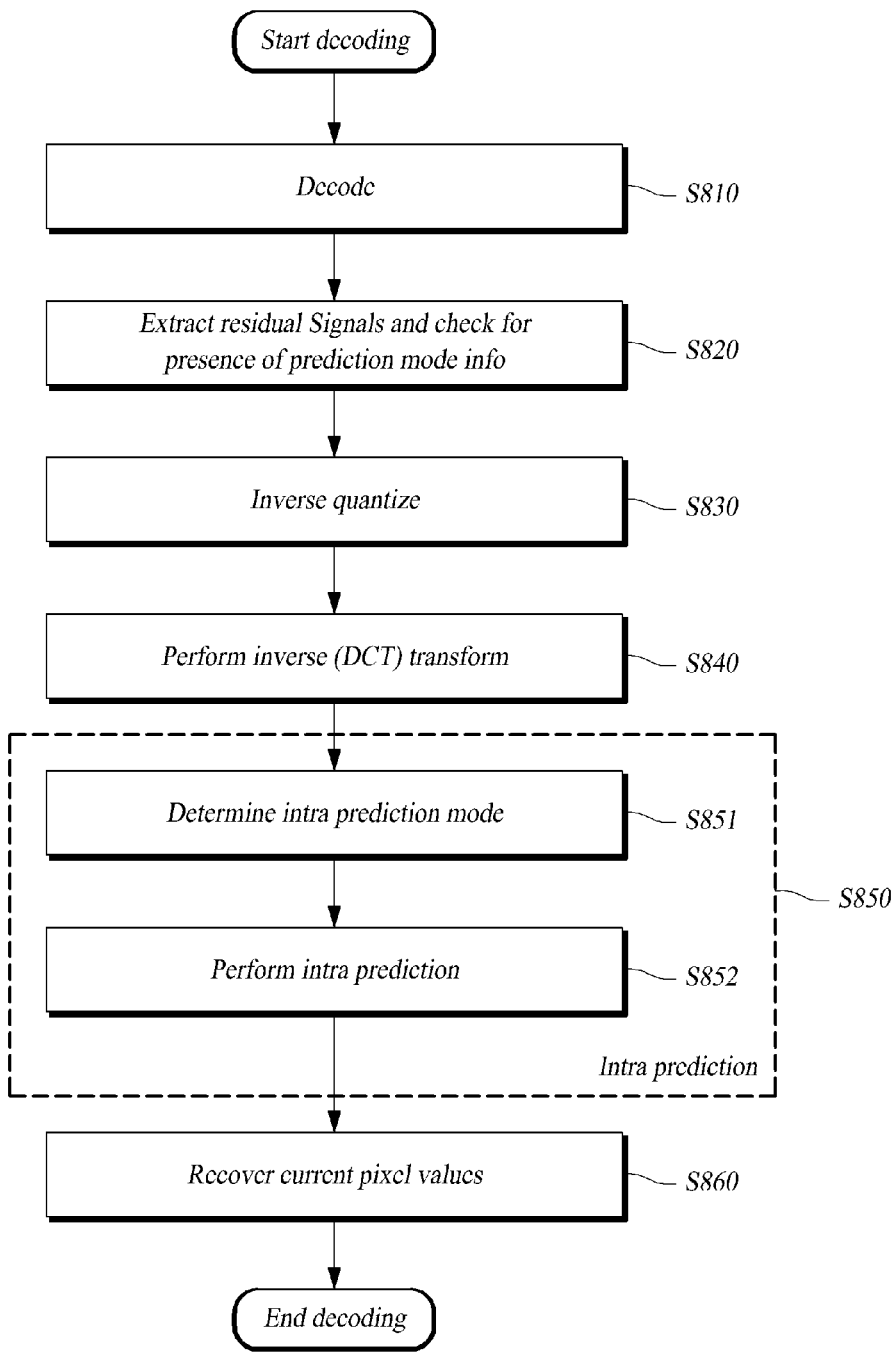
FIG. 8 is a flow diagram of a video decoding method according to an embodiment of the present disclosure.

FIG. 8 is a flow diagram of a video decoding method according to an embodiment of the present disclosure.

Referring to FIG. 8, the video decoding method may be comprised of the steps of decoding received bitstream S810, extracting residual signals and prediction mode information from the decoded bitstream S820, inversely quantizing the extracted residual signals S830, performing inversely discrete cosine transform with respect to the inversely quantized residual signals S840, intra predicting through determining an intra prediction mode S850, and reconstructing actual current pixels within the current block using the intra predicted values and the inversely discrete cosine transformed residual signals S860.

The decoding step S810 decodes received bitstream. Here, the bitstream may include a first field to which bits for the coded block pattern (CBP) and residual coefficients are assigned and a second field to which bits for intra prediction mode information are assigned where the first field is included in front of the second field.

After the decoding of the bitstream, the residual and prediction mode information extracting step S820 extracts the same from the decoded bitstream in the decoding step S810. At this time, the residual signals are extracted from the first field included in the decoded bitstream and the prediction mode information is extracted from the second field included in the decoded bitstream. If the encoding has been done in the above first prediction mode, the prediction mode information is not present. However, if the encoding has been done in the second prediction mode, the prediction mode information is present in the bitstream.

The inverse quantizing step S830 performs inverse quantization with respect to the extracted residual signals in step S820.

The inversely discrete cosine transforming step S840 inversely discrete cosine transforms the inversely quantized residual signals at step S830.

The intra predicting step S850 may determine in which one of the above first and second prediction modes the block to currently decode (current block) was intra predicted by prosecuting the prediction mode determining method of the present disclosure as in the video encoding of the disclosure.

If the current block were intra predicted in the above first prediction mode, the predicted values for recovering the current block may be obtained by performing the intra predictions in the above single predetermined prediction mode.

If the current block were determined as intra predicted in the above second prediction mode, then the intra predictions are performed using the intra prediction mode information that is extracted from the received bitstream. That is, in the prediction mode represented by that extracted intra prediction mode information the intra prediction is performed in order to obtain the predicted values of the current block.

The current pixel recovering step S860 reconstructs the actual current pixels within the current block by adding the inversely discrete cosine transformed residual signals from the inverse DCT transforming step S840 to the intra predicted values generated by the intra predicting step S850. These reconstructed actual current pixel values are then reproduced.

The above mentioned intra predicting step S850 may be performed in two separate steps of determining an intra prediction mode S851 in accordance with the probable presence of the prediction mode information in step S820 and performing intra predictions S851 in the thus determined intra prediction mode.

Although the intra mode of H.264/AVC has been exemplified for the purpose of descriptions, in the intra predictions of forthcoming video compressions not only different sizes (N) of regular square but also various rectangular (N×M) sized block modes may be used as well and more prediction modes may be used in comparison with the intra mode of H.264/AVC. Also in that case, the described first prediction mode method in FIG. 7 may be modified to the corresponding encoding and decoding apparatuses.

Although exemplary embodiments of the disclosure have been described for illustrative purposes, those skilled in the art will appreciate that various modifications, additions and substitutions are possible, without departing from the essential characteristics of the invention. Therefore, the embodiments disclosed in the present invention have been described not for limiting the technical idea of the invention, but for describing the invention. Accordingly, the scope of the invention is not to be limited by the above embodiments but by the appended claims and the equivalents thereof.

INDUSTRIAL APPLICABILITY

As described above, the present disclosure is applicable to the video encoding technology in order to reduce unnecessary intra prediction mode determination procedures and thus practically improve the video compression efficiency.

The invention claimed is:

1. A video encoding apparatus for determining an intra prediction mode of a current block and selectively encoding information on the intra prediction mode of the current block, the apparatus comprising:
   an intra predictor configured to predict the current block, the intra predictor comprising:
      a variation calculator configured to calculate a variation of adjacent pixels in one or more adjacent blocks, wherein the adjacent pixels are adjacent to the current block and located outside of the current block,
      a comparator configured to compare the variation of the adjacent pixels in the adjacent blocks and a threshold, and
      a prediction mode determination unit configured to determine the intra prediction mode of the current block, wherein
         a predetermined intra prediction mode is determined as the intra prediction mode of the current block when the variation of the adjacent pixels in the adjacent blocks is below the threshold, and
         a particular intra prediction mode from a plurality of intra prediction modes is determined as the intra prediction mode of the current block when the variation of the adjacent pixels in the adjacent blocks is greater than the threshold; and
   an encoder configured
      to generate a bitstream by encoding a difference between the predicted current block and the current block,
      to encode the information on the determined intra prediction mode of the current block into the bitstream when the variation of the adjacent pixels in the adjacent blocks is greater than the threshold, and
      not to encode the information on the determined intra prediction mode of the current block into the bitstream when the variation of the adjacent pixels in the adjacent blocks is below the threshold,
   wherein the intra prediction mode of the current block indicates a prediction direction of the current block.

2. The apparatus of claim 1, wherein
   the variation calculator is further configured to calculate the variation of the adjacent pixels in the adjacent blocks by using dispersion, the dispersion is one selected from the group consisting of variance, standard deviation and quartile deviation.

3. The apparatus of claim 1, further comprising
   a threshold setter configured to set the threshold using at least one selected from the group consisting of a quantization parameter and a quantization step size.

4. The apparatus of claim 1, wherein the prediction mode determination unit is further configured to preset the predetermined intra prediction mode as an intra prediction mode which uses the average value of the adjacent pixels in the adjacent blocks for predicted values of the current block.

5. The apparatus of claim 1, wherein the prediction mode determination unit is further configured to
   perform an intra prediction in each of the plurality of the intra prediction modes,
   calculate a cost through a cost function predetermined by a rate-distortion optimization, and
   determine the particular intra prediction mode of the current block, wherein the particular intra prediction mode is one mode of the plurality of the intra prediction modes with the lowest calculated cost.

6. The apparatus of claim 1, wherein the prediction mode determination unit is further configured to reset mode numbers of the plurality of the intra prediction modes so that a mode number of the predetermined intra prediction mode is higher than mode numbers of the other intra prediction modes, when the variation of the adjacent pixels in the adjacent blocks is greater than the threshold.

7. A video encoding method for determining an intra prediction mode of a current block and selectively encoding information on the intra prediction mode of the current block, the method comprising:
   calculating a variation of adjacent pixels in one or more adjacent blocks, wherein the adjacent pixels are adjacent to a current block and located outside of the current block;
   comparing the variation of the adjacent pixels in the adjacent blocks and a threshold; and
   determining the intra prediction mode of the current block, wherein
      a predetermined intra prediction mode is determined as the intra prediction mode of the current block when the variation of the adjacent pixels in the adjacent blocks is below the threshold, and
      a particular intra prediction mode from a plurality of intra prediction modes is determined as the intra prediction mode of the current block if the variation of the adjacent pixels in the adjacent blocks is greater than the threshold; and
   generating a bitstream by encoding a difference between the predicted current block and the current block,
   wherein the generating of the bitstream further comprises:
      encoding the information on the determined intra prediction mode of the current block into the bitstream when the variation of the adjacent pixels in the adjacent blocks is greater than to the threshold, and
      skipping encoding of the information on the determined intra prediction mode of the current block into the bitstream when the variation of the adjacent pixels in the adjacent blocks is below the threshold,
      wherein the intra prediction mode of the current block indicates a prediction direction of the current block.

8. An apparatus for encoding a video by determining an intra prediction mode of a current block and selectively encoding information on the intra prediction mode of the current block, the apparatus comprising:
   an intra predictor configured to
      calculate a variation of adjacent pixels in one or more adjacent blocks, wherein the adjacent pixels are adjacent to the current block to compare the variation of the adjacent pixels in the adjacent blocks with a threshold, wherein the adjacent pixels in the adjacent blocks are located outside of the current block, determine the intra prediction mode of the current block, wherein a predetermined intra prediction mode is determined as the intra prediction mode of the current block when the variation of the adjacent pixels in the adjacent blocks is below the threshold, and a particular intra prediction mode from a plurality of intra prediction modes is determined as the intra prediction mode of the current block when the variation of the adjacent pixels in the adjacent blocks is greater than the threshold, and generate intra predicted values of the current block by performing an intra prediction using the intra prediction mode of the current block;

a subtractor configured to generate residual signals by subtracting the intra predicted values from the current block;

a transformer configured to perform transform on the generated residual signals;

a quantizer configured to perform quantization on the transformed residual signals; and an encoder configured to encode the quantized residual signals into a bitstream;

to encode the information on the determined intra prediction mode of the current block into the bitstream when the variation of the adjacent pixels in the adjacent blocks is below the threshold, and not to encode the information on the determined intra prediction mode of the current block into the bitstream when the variation of the adjacent pixels in the adjacent blocks is greater than the threshold, wherein the intra prediction mode of the current block indicates a prediction direction of the current block.

9. The video encoding apparatus of claim 8, wherein the encoder is further configured to encode the quantized residual signals into the bitstream including a first field to which information on a coded block pattern or residual coefficients are assigned, wherein the bitstream selectively includes a second field to which the information on the determined intra prediction mode is assigned according to a comparison result between the variation and the threshold.

10. The video encoding apparatus of claim 9, wherein the bitstream does not include the second field for the information on the determined intra prediction mode when the variation is below the threshold.

11. The video encoding apparatus of claim 9, wherein the bitstream includes the second field for the information on the determined intra prediction mode when the variation is greater than the threshold, and the first field precedes the second field.

12. A method for encoding a video by determining an intra prediction mode of a current block and selectively encoding information on the intra prediction mode of the current block, the method comprising:

calculating a variation of adjacent pixels in one or more adjacent blocks to compare the variation of the adjacent pixels in the adjacent blocks with a threshold, wherein the adjacent pixels in the adjacent blocks are adjacent to the current block and are located outside of the current block;

determining an intra prediction mode of the current block, wherein a predetermined intra prediction mode is determined as the intra prediction mode of the current block when the variation of the adjacent pixels in the adjacent blocks is below the threshold, and a particular intra prediction mode from a plurality of intra prediction modes is determined as the intra prediction mode of the current block when the variation of the adjacent pixels in the adjacent blocks is greater than the threshold;

generating intra predicted values of the current block by performing the intra prediction using the intra prediction mode of the current block;

generating residual signals by subtracting the intra predicted values from the current block;

performing transform on the generated residual signals;

performing quantization on the transformed residual signals; and encoding the quantized residual signals into a bitstream by encoding the information on the determined intra prediction mode of the current block into the bitstream when the variation of the adjacent pixels in the adjacent blocks is below the threshold, and skipping encoding of the information on the determined intra prediction mode of the current block into the bitstream when the variation of the adjacent pixels in the adjacent blocks is greater than the threshold;

wherein the intra prediction mode of the current block indicates a prediction direction of the current block.

13. The video encoding method of claim 12, wherein the encoding of the quantized residual signals further comprises, encoding the quantized residual signals into the bitstream including a first field to which information on a coded block pattern or residual coefficients are assigned, wherein the bitstream selectively includes a second field to which the information on the determined intra prediction mode is assigned, according to a comparison result between the variation and the threshold.

14. The video encoding method of claim 13, wherein the bitstream does not include the second field for the information on the determined intra prediction mode when the variation is below the threshold.

15. The video encoding method of claim 13, wherein the bitstream includes the second field for the information on the determined intra prediction mode when the variation is greater than the threshold, and the first field precedes the second field.

16. A video decoding apparatus for determining an intra prediction mode of a current block by selectively extracting information on the intra prediction mode of the current block from a bitstream, the apparatus comprising:

a decoder configured to decode the bitstream to extract residual signals of the current block;

an inverse quantizer configured to perform inverse quantization on the extracted residual signals;

an inverse transformer configured to perform inverse transform on the inversely quantized residual signals;

an intra predictor configured to calculate a variation of adjacent pixels in one or more adjacent blocks, wherein the adjacent pixels are adjacent to the current block and located outside of the current block, determine the intra prediction mode of the current block, wherein information on a particular intra prediction mode is extracted from the bitstream and the extracted particular intra prediction mode is determined as the intra prediction mode of the current block, when the variation of the adjacent pixels in the adjacent blocks is greater than the threshold, and the information on the intra prediction mode of the current block is not extracted from the bitstream and a predetermined intra prediction mode is determined as the intra prediction mode of the current block, when the variation of the adjacent pixels in the adjacent blocks is below a threshold, generate an intra predicted block of the current block by performing an intra prediction using the determined intra prediction mode of the current block; and an adder configured to add the inversely transformed residual signals to the intra predicted block of the current block in order to reconstruct the current block, wherein the intra prediction mode of the current block indicates a prediction direction of the current block.

17. The video decoding apparatus of claim 16, wherein the bitstream includes a first field to which information on a coded block pattern or residual coefficients are assigned, wherein the bitstream selectively includes a second field to which the information on the particular intra prediction mode is assigned, according to a comparison result between the variation of the adjacent pixels in the adjacent blocks and the threshold, and wherein the first field precedes the second field.

18. A video decoding method for determining an intra prediction mode of a current block by selectively extracting information on the intra prediction mode of the current block from a bitstream, the method comprising:

extracting residual signals of the current block from the bitstream;

performing inverse quantization on the extracted residual signals;

performing inverse transform on the inversely quantized residual signals;

calculating a variation of adjacent pixels in one or more adjacent blocks, wherein the adjacent pixels are adjacent to the current block and located outside of the current block;

determining the intra prediction mode of the current block, wherein information on a particular intra prediction mode is extracted from the bitstream and the extracted particular intra prediction mode is determined as the intra prediction mode of the current block, when the variation of the adjacent pixels in the adjacent blocks is greater than the threshold, and a predetermined intra prediction mode is determined as the intra prediction mode of the current block when the variation is below a threshold;

generating an intra predicted block of the current block by performing an intra prediction using the intra prediction mode; and reconstructing the current block by adding the inversely transformed residual signals to the intra predicted block, wherein the intra prediction mode of the current block indicates a prediction direction of the current block.

19. The apparatus of claim 16, wherein the threshold is determined by at least one selected from the group consisting of a quantization parameter and a quantization step size.

20. The apparatus of claim 1, wherein the variation calculator is configured to calculate the variation, by using pixels of an upper block adjacent to the current block and pixels of a left block adjacent to the current block as the adjacent pixels in the adjacent blocks.

21. The apparatus of claim 5, wherein the predetermined cost function comprises at least on selected from the group consisting Sum of Absolute Value (SAD), Sum of Absolute Transformed Difference (SATD), Sum of Squared Difference (SSD), Mean of Absolute Difference (MAD), Lagrange Function.

* * * * *